United States Patent
Hong et al.

(10) Patent No.: US 9,221,558 B2
(45) Date of Patent: Dec. 29, 2015

(54) APPARATUS AND METHOD FOR CALCULATING SATELLITE NAVIGATION VISIBILITY

(71) Applicant: Korea Aerospace Research Institute, Seoul (KR)

(72) Inventors: Woon Ki Hong, Seoul (KR); Eun Sung Lee, Seoul (KR); Kwang Sik Choi, Seoul (KR); Moon Beom Heo, Seoul (KR); Gi Wook Nam, Seoul (KR)

(73) Assignee: Korea Aerospace Research Institute, Daejeon (KR)

( * ) Notice: Subject to any disclaimer, the term of this patent is extended or adjusted under 35 U.S.C. 154(b) by 45 days.

(21) Appl. No.: 14/092,352

(22) Filed: Nov. 27, 2013

(65) Prior Publication Data

US 2014/0185940 A1  Jul. 3, 2014

(30) Foreign Application Priority Data

Dec. 31, 2012 (KR) .......................... 10-2012-0157816

(51) Int. Cl.
*G06K 9/00* (2006.01)
*B64G 1/10* (2006.01)

(52) U.S. Cl.
CPC ....................................... *B64G 1/10* (2013.01)

(58) Field of Classification Search
CPC ........ G06K 9/0063; G06K 9/18; H04N 9/045; H04N 5/232
USPC .................. 382/201, 100; 348/222.1, E5.024, 348/357.52
See application file for complete search history.

(56) References Cited

U.S. PATENT DOCUMENTS

2005/0010365 A1*  1/2005  Chapman et al. .................. 702/3
2012/0293678 A1*  11/2012  Amor Molares et al. .. 348/222.1

OTHER PUBLICATIONS

Hong et al: "Analysis of GNSS Performance Index Using Feature Points of Sky-View Image", IEEE, Apr. 2014.*
Blennow: "Sky view factor from high-resolution scanned fish-eye lens photographic negatives", AMS, 1995.*
Chapman et al: "Short Communication Sky-View Factor Approximation Using GPS Receivers", RMS, 2002.*

* cited by examiner

*Primary Examiner* — Ruiping Li
(74) *Attorney, Agent, or Firm* — The Webb Law Firm (57) ABSTRACT

Provided is a satellite navigation visibility calculation apparatus. The satellite navigation visibility calculation apparatus includes a processing unit configured to binarize an input sky view image to create an binary image, an extraction unit configured to extract a plurality of feature points from the binary image, and a calculation unit configured to calculate satellite navigation dilution of precision (DOP) corresponding to the sky view image using the plurality of feature points.

17 Claims, 8 Drawing Sheets

APPARATUS AND METHOD FOR CALCULATING SATELLITE NAVIGATION VISIBILITY

CROSS-REFERENCE TO RELATED APPLICATION

This application claims priority to and the benefit of Korean Patent Application No. 10-2012-0157816, filed on Dec. 31, 2012, the disclosure of which is incorporated herein by reference in its entirety.

BACKGROUND

1. Field of the Invention

The present invention relates to an apparatus and method for calculating satellite navigation visibility and, more particularly, to an apparatus and method for calculating satellite navigation availability in a ground transport environment using a sky view image.

2. Discussion of Related Art

When positioning is performed using a satellite navigation signal, an error in the positioning is affected by performance indices such as satellite navigation visibility, dilution of precision (DOP), a signal to noise ratio, and so on. In general, the performance indices are analyzed on a corresponding region before the positioning is performed using the satellite navigation signal, and then measurement is allowed to be performed when a predicted satellite navigation error is the least in the region.

The performance indices are highly utilized in a region where the satellite navigation visibility is good, for example, in an open area environment, and are less utilized in a region where there are many tall buildings, for example, in a ground transport environment. Accordingly, if a region is not the open area, the performance indices should be analyzed with a 3-dimensional topographic map of a measurement point. However, it is difficult to obtain the 3-dimensional topographic map, and even though the 3-dimensional topographic map is obtained, it takes a long time to develop a program for predicting the performance indices in the region using the 3-dimensional topographic map.

In the related art, a sky view factor (SVF) is calculated and used for environmental analysis. The SVF is a parameter indicating the extent of sky observed from a point as a proportion of the total visible sky hemisphere. For example, the SVF is equal to 0 if the sky is completely visible (for example, an open area), and the SVF is equal to 1 if the sky is completely invisible (for example, a sealed region).

However, as described below, the SVF indicates the extent to which the sky is visible or invisible, and has a limitation when utilized as a performance index for satellite navigation-based positioning.

Accordingly, a new parameter available for the environmental analysis is required in order to perform an accurate analysis, instead of or in addition to the SVF.

SUMMARY OF THE INVENTION

According to an aspect of the present invention, there is provided a satellite navigation visibility calculation apparatus, including: a processing unit configured to binarize an input sky view image to create an binary image; an extraction unit configured to extract a plurality of feature points from the binary image; and a calculation unit configured to calculate satellite navigation dilution of precision (DOP) corresponding to the sky view image using the plurality of feature points.

The extraction unit may form a plurality of virtual lines originating from a central point of the binary image at a certain angle, search for boundary points between a sky and an object on the plurality of virtual lines, and extract the boundary points as the plurality of feature points.

The certain angle may be 30 degrees, and the number of the plurality of virtual lines originating from the central point may be 12.

The satellite navigation visibility calculation apparatus may further include a conversion unit configured to convert positions of the plurality of feature points from spherical coordinates to Cartesian coordinates.

The satellite navigation visibility calculation apparatus may further include a photographing unit configured to take a photograph with a fisheye lens in a vertical direction to create the input sky view image.

According to another aspect of the present invention, there is provided a satellite navigation visibility calculation apparatus, including: a filter unit configured to apply an edge detect filter to an input sky view image to create an edge-filtered image; a processing unit configured to binarize the edge-filtered image to create an binary image; an extraction unit configured to extract a plurality of feature points from the binary image; and a calculation unit configured to calculate satellite navigation dilution of precision (DOP) corresponding to the sky view image using the plurality of feature points.

The extraction unit may form a plurality of virtual lines originating from a central point of the binary image at a certain angle, search for boundary points between a sky and an object on the plurality of virtual lines, and extract the boundary points as the plurality of feature points.

The certain angle may be 30 degrees, and the number of the plurality of virtual lines originating from the central point may be 12.

According to another aspect of the present invention, there is provided a satellite navigation visibility calculation method, including: binarizing an input sky view image to create an binary image; extracting a plurality of feature points from the binary image; and calculating satellite navigation dilution of precision (DOP) corresponding to the sky view image using the plurality of feature points.

The extracting of the plurality of feature points may include forming a plurality of virtual lines originating from a central point of the binary image at a certain angle, searching for boundary points between a sky and an object on the plurality of virtual lines, and extracting the boundary points as the plurality of feature points.

The certain angle may be 30 degrees, and the number of the plurality of virtual lines originating from the central point may be 12.

The satellite navigation visibility calculation method may further include converting positions of the plurality of feature points from spherical coordinates to Cartesian coordinates.

According to another aspect of the present invention, there is provided a satellite navigation visibility calculation method, including: applying an edge detect filter to an input sky view image to create an edge-filtered image; binarizing the edge-filtered image to create an binary image; extracting a plurality of feature points from the binary image; and calculating satellite navigation dilution of precision (DOP) corresponding to the sky view image using the plurality of feature points.

The extracting of the plurality of feature points may include forming a plurality of virtual lines originating from a central point of the binary image at a certain angle, searching for boundary points between a sky and an object on the plurality of virtual lines, and extracting the boundary points as the plurality of feature points, in which the certain angle is 30 degrees, and the number of the plurality of virtual lines originating from the central point is 12.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, some embodiments will be described in detail with reference to the accompanying drawings. However, the present invention is not limited thereto. Like reference numerals in the drawings denote like elements.

Most of the terms used herein are general terms that have been widely used in the technical art to which the present invention pertains. However, some of the terms used herein may be created reflecting intentions of technicians in this art, precedents, or new technologies.

Also, some of the terms used herein may be arbitrarily chosen by the present applicant for helping a reader's comprehension or for the convenience of explanation. In this case, these terms are defined in detail below. Accordingly, the specific terms used herein should be understood based on the unique meanings thereof and the whole context of the present invention.

Throughout the specification, the satellite navigation dilution of precision (DOP) may be understood to indicate DOP used as a positioning performance index that utilizes a satellite navigation measurement value, and sky view DOP (SV-DOP) may be understood to be included in the satellite navigation DOP.

Figure 1:
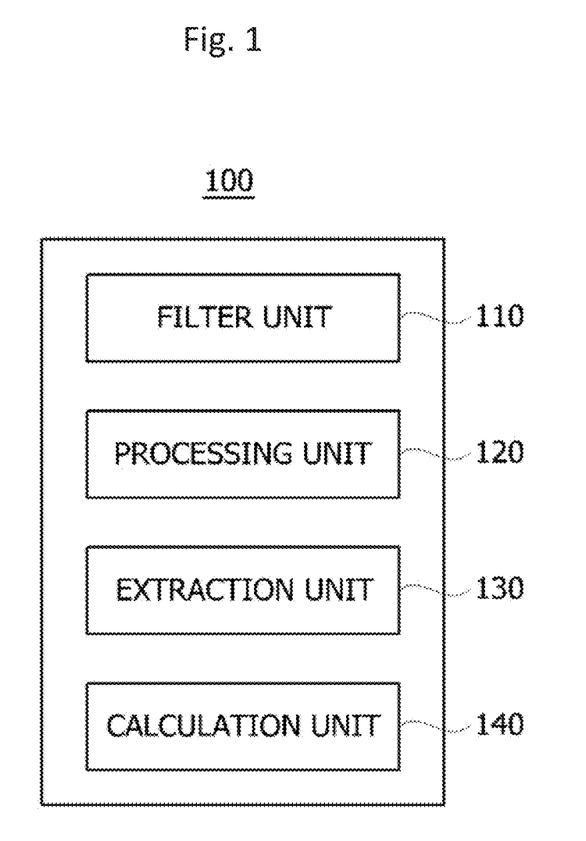
FIG. 1 is a block diagram showing an apparatus for calculating satellite navigation visibility according to an embodiment of the present invention.

FIG. 1 is a block diagram showing a satellite navigation visibility calculation apparatus 100 according to an embodiment of the present invention. The satellite navigation visibility calculation apparatus 100 may acquire an image from a fisheye lens or camera in order to perform real-time environmental analysis in a ground transport environment, find a feature point where the image meets a virtual line formed from a central point of the acquired image, and calculate satellite navigation dilution of precision DOP available to the ground transport environment, using the feature point.

The satellite navigation visibility calculation apparatus 100 may include a filter unit 110, a processing unit 120, an extraction unit 130, and a calculation unit 140. However, the filter unit 110 is an optional component, which may be omitted in some embodiments.

The processing unit 120 may binarize an input sky view image to create a binary image.

The extraction unit 130 may extract a plurality of feature points from the binary image.

The extraction unit 130 may form a plurality of virtual lines originating from a central point of the binary image at a certain angle, search for boundary points between a sky and an object on the plurality of virtual lines, and extract the boundary points as the plurality of feature points.

In this case, the certain angle may be 30 degrees, and the number of the plurality of virtual lines originating from the central point of the binary image may be 12.

According to an embodiment of the present invention, the satellite navigation visibility calculation apparatus 100 may further include a conversion unit configured to convert positions of the plurality of feature points from spherical coordinates to Cartesian coordinates.

The calculation unit 140 may calculate the satellite navigation dilution of precision (DOP) corresponding to the sky view image, using the plurality of feature points.

The satellite navigation visibility calculation apparatus 100 may further include a photographing unit configured to photograph an image with a fisheye lens in a vertical direction to create the input sky view image.

The photographing unit will be described below with reference to FIG. 2.

A satellite navigation visibility calculation apparatus 100 according to another embodiment may not directly binarize the input sky view image, but apply an edge detect filter to the input sky view image and then binarize the input sky view image to calculate satellite navigation DOP. In this case, the satellite navigation visibility calculation apparatus 100 may further include the filter unit 110.

The filter unit 110 may apply the edge detect filter to the input sky view image to create an edge-filtered image.

The processing unit 120 may binarize the edge-filtered image to create a binary image.

The extraction unit 130 may extract a plurality of feature points from the binary image, form a plurality of virtual lines originating from a central point of the binary image at a certain angle, search for boundary points between a sky and an object on the plurality of virtual lines, and extract the boundary points as the plurality of feature points.

In this case, the certain angle may be 30 degrees, and the number of the plurality of virtual lines originating from the central point may be 12.

In addition, the calculation unit 140 may calculate the satellite navigation dilution of precision (DOP) corresponding to the sky view image, using the plurality of feature points.

Figure 2:
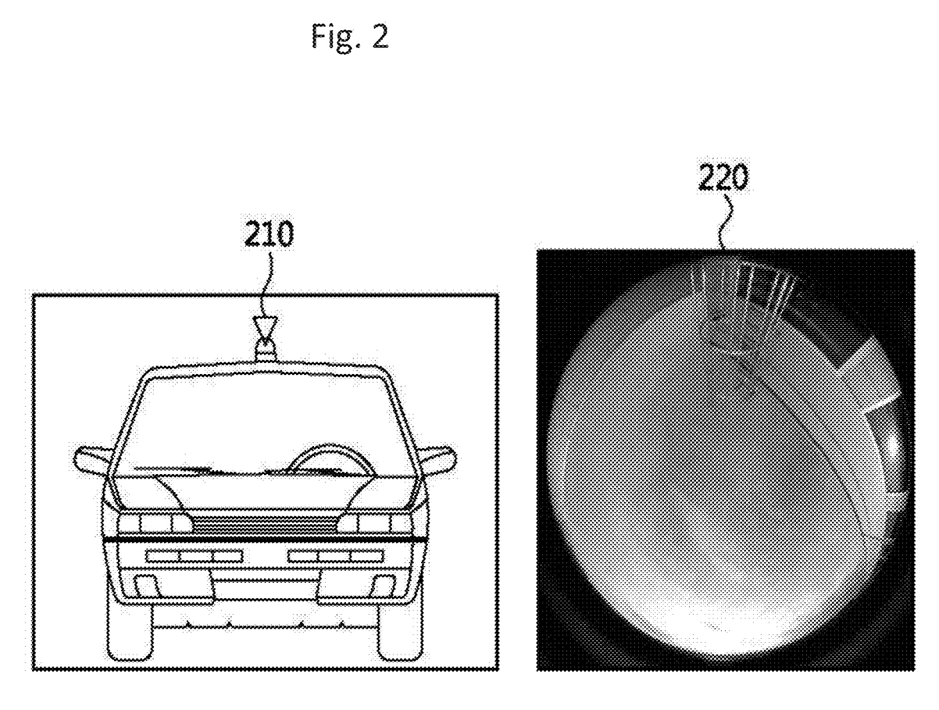
FIG. 2 is a view showing an input sky view image created according to an embodiment of the present invention.

FIG. 2 is a view showing an input sky view image created according to an embodiment of the present invention.

In order to accurately acquire the sky view image, an image is photographed at the center of a vehicle for measurement in a direction perpendicular to the sky. In this case, a fisheye lens that can give a 360° view of the sky may be used to photograph the image.

As shown in 210 of FIG. 2, the fisheye lens may be equipped at the center of the vehicle, and thus the sky view image for predicting satellite navigation performance may be photographed even if a user moves fast in the ground transport environment. A photographed image 220 is as shown in FIG. 2.

The satellite navigation visibility calculation apparatus 100 may binarize the acquired input sky view image 220, extract feature points therefrom, and calculate satellite navigation DOP using the extracted feature points.

Figure 3:
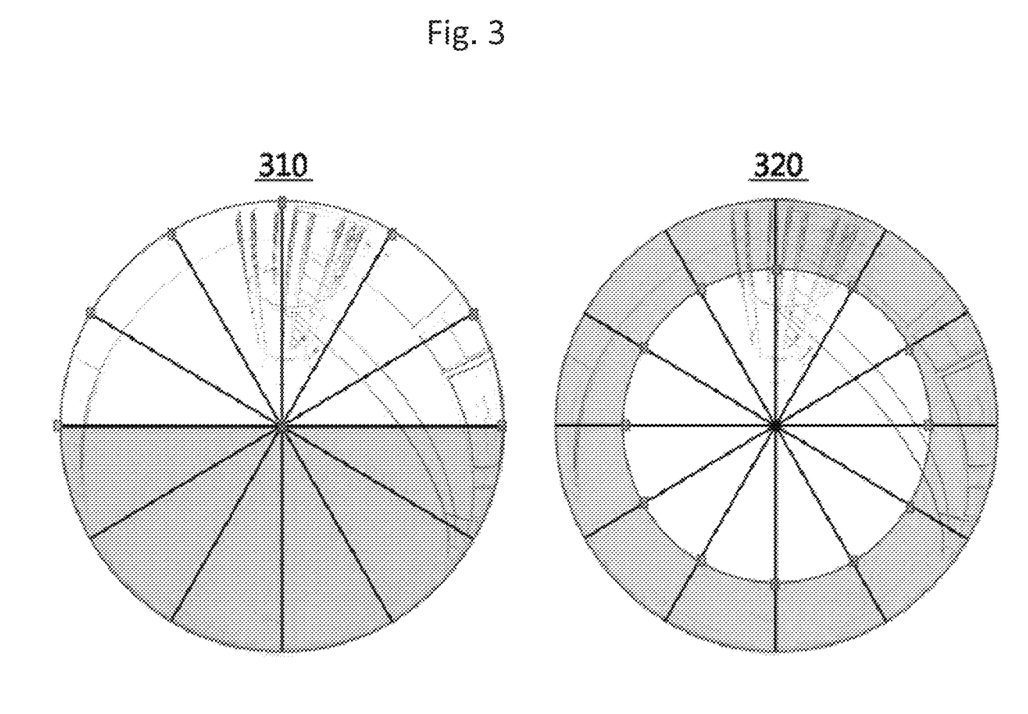
FIG. 3 is a view illustrating a typical limitation of the SVF and a need for satellite navigation dilution of precision (DOP) calculation according to an embodiment of the present invention.

FIG. 3 is a view illustrating a typical limitation of the related art SVF and a need for satellite navigation DOP calculation according to an embodiment of the present invention.

As described above, a sky view factor (SVF) that has been conventionally used is a parameter indicating the extent of sky observed from a point as a proportion of the total visible sky hemisphere. For example, the SVF is equal to 0 if the sky is completely visible, and the SVF is equal to 1 if the sky is completely invisible.

When the SVF is utilized for satellite navigation prediction, the SVF may be easily utilized as a performance index without a specific database such as a topographic map, even in a region where there are many tall buildings, such as a downtown area, as well as an open area.

However, the conventional SVF indicates the extent to which the sky is open or close, and has a limitation when utilized as a performance index for satellite navigation-based positioning.

When a lower half circle area is shielded as in 310 of FIG. 3, and an outer circle area is shielded as in 320 of FIG. 3, each SVF is equal to 0.5 in observing a sky view of a specific region.

However, two navigation satellites are observed in 310 while four navigation satellites are observed in 320. Accordingly, the SVF cannot be directly utilized as a performance index for satellite navigation positioning in a region where there is a building, such as in the ground transport environment.

Accordingly, instead of or in addition to utilizing the conventional SVF as a performance index for satellite navigation in the ground transport environment, the satellite navigation visibility calculation apparatus 100 according to an embodiment of the present invention calculates a sky view based DOP and presents the sky view based DOP as the performance index (parameter).

Examples of the DOP, which is used as a positioning performance index utilizing the satellite navigation measurement value, include a geometric DOP (GDOP), a horizontal DOP (HDOP), a vertical DOP (VDOP), a time DOP (TDOP), etc. A series of processes for calculating the DOP will be described as follows.

A code measurement value of an ith navigation satellite is expressed as Equation (1) below.

$$\rho_u^i = \sqrt{(x_i-x_u)^2+(y_i-y_u)^2+(z_i-z_u)^2}+cb_u+v_i \quad (1)$$

where $\rho$ is a satellite navigation code measurement value, and i is a navigation satellite identifier, and u is a user identifier. Also, $x_i$, $y_i$, and $z_i$ are coordinates of the ith navigation satellite, and $x_u$, $y_u$, and $z_u$ are coordinates of a user u. In addition, c is a speed of light, $b_u$ is a receiver clock bias, and v is a measurement noise.

Equation (2) may be derived as follows by linearizing Equation (1) with respect to an initial user position $x_0$, $y_0$, and $z_0$ for n satellites.

$$\Delta\rho = H\Delta x + v \quad (2)$$

where $\Delta\rho$ is a pseudorange difference vector, H is a line-of-sight matrix for navigation satellites with respect to a linearization reference point, $\Delta x$ is a vector of user coordinates and a receiver clock error with respect to the linearization reference point, and v is a measurement noise vector.

The ith row of the matrix H in Equation (2), $h_i$, is expressed as Equation (3). Thus, it can be seen that the physical meaning of the matrix H is a line-of-sight vector of a satellite with respect to the initial user position.

$$h_i = \left[-\frac{x^i-x_0}{\rho_0^i} \quad -\frac{y^i-y_0}{\rho_0^i} \quad -\frac{z^i-z_0}{\rho_0^i}\right] \quad (3)$$

Here, GDOP is associated with the matrix H of Equation (2), and may be calculated by utilizing a diagonal component of $(HH^T)^{-1}$.

When positioning is performed in the ground transport environment, a horizontal error is important, and thus HDOP is utilized as a performance index. A method of calculating HDOP may be expressed by Equations (4) to (6).

$$(HH^T)^{-1} = \begin{bmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \end{bmatrix} \quad (4)$$

$$GDOP = \sqrt{D_{11}+D_{22}+D_{33}+D_{44}} \quad (5)$$

$$HDOP = \sqrt{D_{11}+D_{22}} \quad (6)$$

In addition, sky view DOP (SVDOP) may be calculated using the sky view image.

Figure 4:
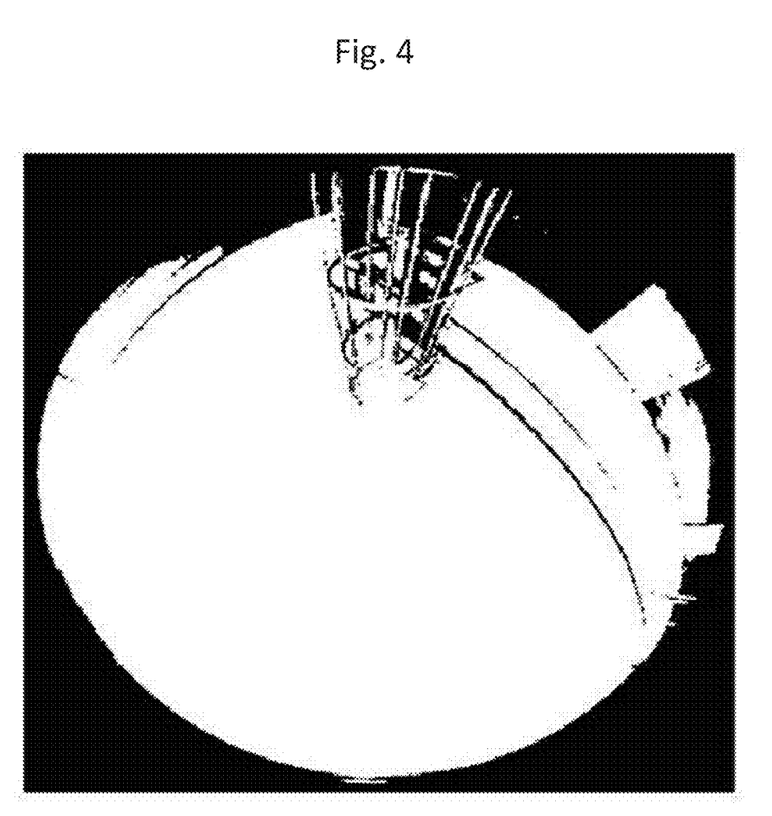
FIG. 4 is a view showing a binary image of an input sky view image created according to an embodiment of the present invention.

Specifically, the SVDOP may be calculated by binarizing the sky view image photographed with a fisheye lens having an angle of sight of 180 degrees, as in FIG. 4, to obtain a binary image, forming a plurality of virtual lines originating from a central point of the binary image at a certain angle (for example, 12 virtual lines at an angle of 30 degrees), extracting points where the virtual lines meet the binary image as feature points, converting positions of the extracted feature points to Cartesian coordinates, and calculating DOP on the assumption that the coordinates of the points are virtual navigation satellite coordinates.

In 310 and 320 of FIG. 3, the SVDOP may vary depending to a measurement environment even though the SVF is the same, and thus may be utilized as a performance index for satellite navigation positioning.

Coordinates of a feature point i of the sky view measured by the fisheye lens may be expressed using an azimuth angle $\Phi_i$ and an altitude angle $\theta_i$ of a spherical coordinate system and then converted to Cartesian coordinates $x_i$, $y_i$, and $z_i$.

A coordinate conversion equation between the spherical coordinate system and the Cartesian coordinate system may be expressed as Equation (7) below.

$x_i = r\cos(\theta_i)\cos(\Phi_i)$ $y_i = r\cos(\theta_i)\sin(\Phi_i)$ $z_i = r\sin(\theta_i)$ \quad (7)

where r is a distance from the center of the fisheye lens to the feature point projected into the spherical coordinate system, and the distance r of each of the feature points of the sky view is the same.

When the ith row of the matrix H of Equation (3), $h_i$, is applied to virtual navigation satellite coordinates acquired from the sky view, $h_i$ may be expressed as Equation (8).

$$H_i = \begin{bmatrix} -\cos(\theta_i)\cos(\Phi_i) \\ -\cos(\theta_i)\sin(\Phi_i) \\ -\sin(\theta_i) \end{bmatrix}^{-1} \quad (8)$$

where H is calculated by applying Equation (8) to each feature point, and SVDOP is acquired by calculating DOP using H.

SVDOP is equal to 1.11 when a lower half circle area is shielded as in 310 of FIG. 3, and SVDOP is equal to 0.64 when an outer circle area is shielded as in 320 of FIG. 3.

Figure 5:
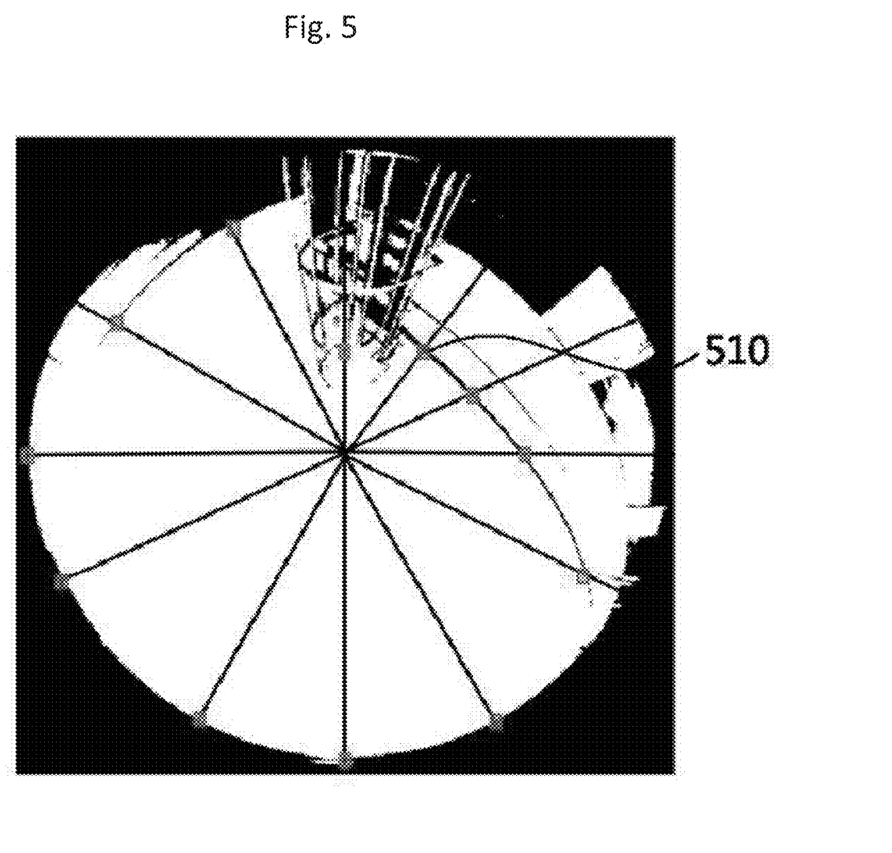
FIG. 5 is a view showing a process of extracting a feature point from the binary image of the input sky view image according to an embodiment of the present invention.

FIG. 4 is a view showing a binary image of an input sky view image created according to an embodiment of the present invention, and FIG. 5 is a view showing a process of extracting a feature point from the binary image of the input sky view image according to an embodiment of the present invention.

When the sky view image including a user surrounding environment is acquired using the fisheye lens as in FIG. 2, the sky view image may be binarized at a certain scale as in FIG. 4.

In addition, the binary image may be divided into an object region and a sky region, and the object region may include a building or tree that is distributed around a user.

According to an embodiment of the present invention, a plurality of virtual lines may be formed to originate from a central point of the binary image of FIG. 4 at an angle of 30 degrees as shown in FIG. 5.

Points where the virtual lines meet the object region may be extracted as feature points 510 from the binary image.

The feature points 510 may form an edge of the sky region where there may be a satellite, and may be used to calculate DOP. The satellite navigation DOP may be calculated using a plurality of feature points extracted from the sky view image.

Unlike a conventional method of simply finding an SVF through an image, the satellite navigation DOP may be calculated in consideration of a shape of the image, thereby analyzing more reliable environmental analysis.

In order to binarize the sky view image as in FIGS. 4 and 5, a binarization scale needs to be adjusted according to the sky view image.

However, even when the binarization has been performed with an adjusted scale, some of the object regions may be removed. Accordingly, before the sky view image is binarized, an edge of a building or obstacle may be checked by applying an edge detect filter to the sky view image.

The applying of the edge detect filter to the sky view image will be described below with reference to FIGS. 6 and 7.

Figure 6:
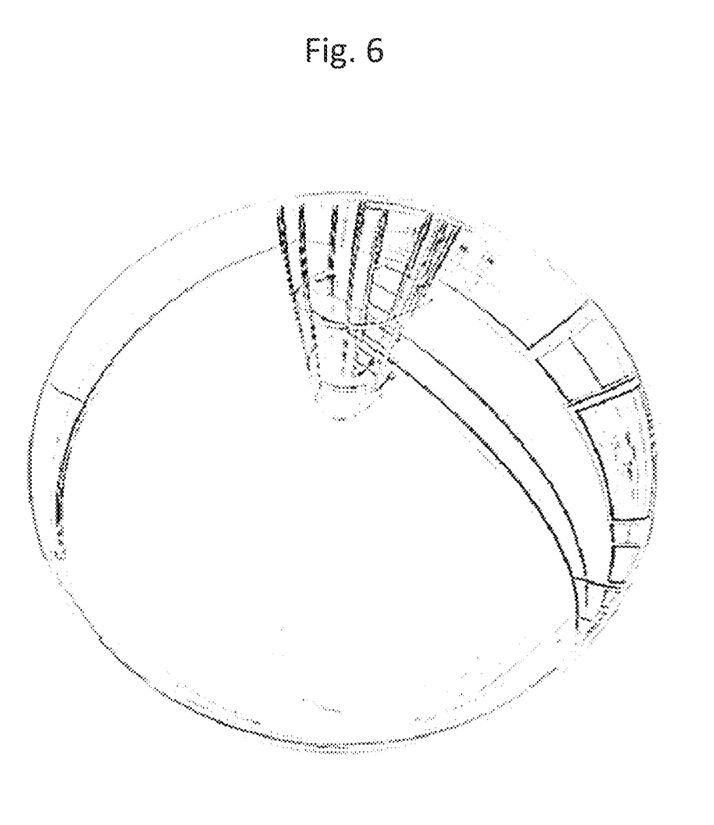
FIG. 6 is a view showing a binary image of an edge-filtered image of the input sky view image created according to an embodiment of the present invention.
Figure 7:
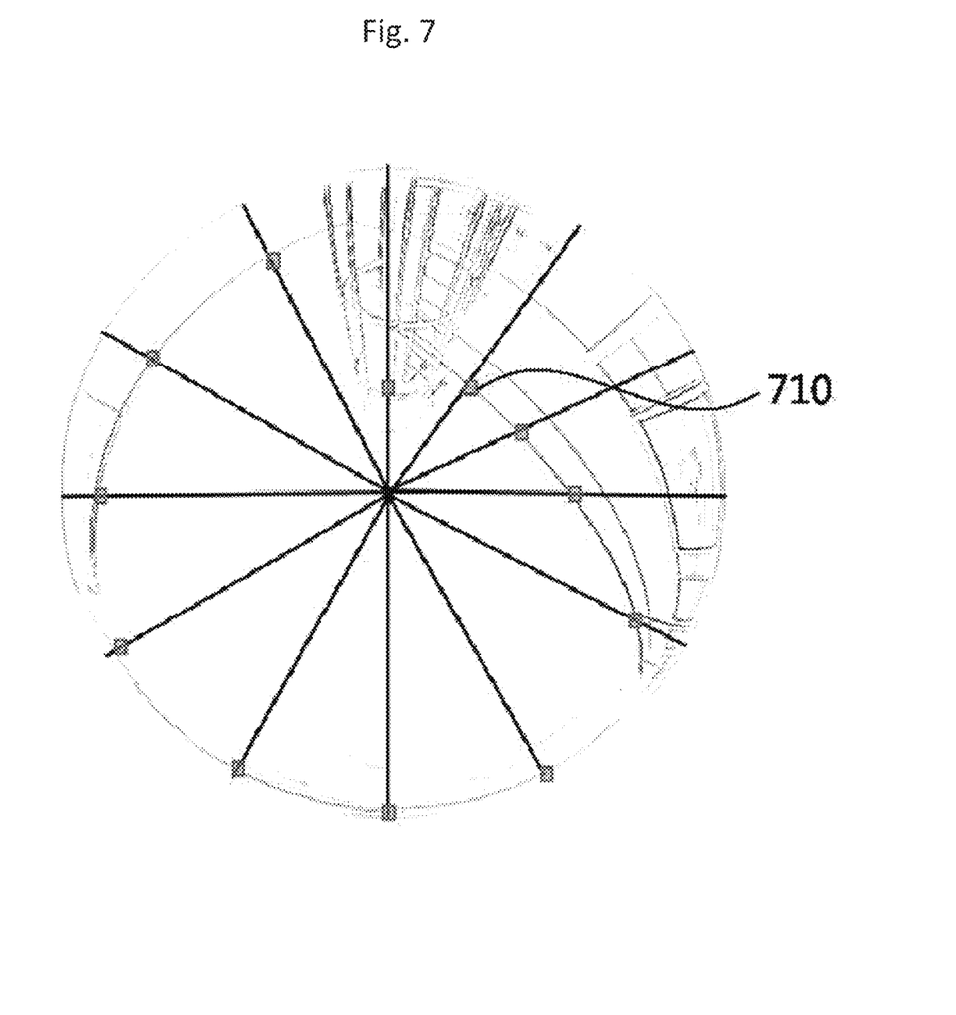
FIG. 7 is a view showing a process of extracting a feature point from the binary image of the edge-filtered image according to an embodiment of the present invention.

FIG. 6 is a view showing a binary image of an edge-filtered image of the input sky view image created according to an embodiment of the present invention, and FIG. 7 is a view showing a process of extracting a feature point from the binary image of the edge-filtered image according to an embodiment of the present invention.

Referring to FIG. 6, an edge of the object, such as a building or obstacle, is detected with the edge detect filter. Referring to FIG. 7, a plurality of virtual lines may be formed from a central point of the image at an angle of 30 degrees.

12 points where the plurality of virtual lines meet the edge of the sky view image which is detected through the edge detect filter may be extracted as feature points 710.

Figure 8:
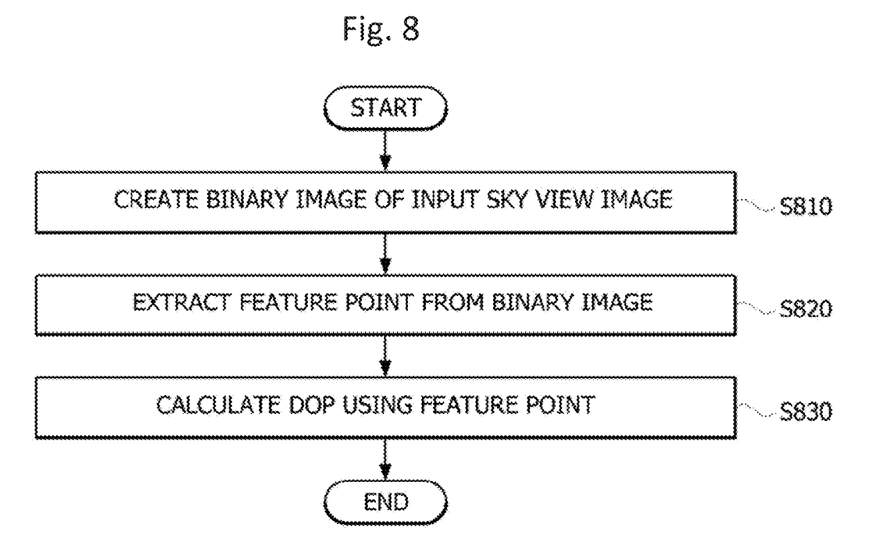
FIG. 8 is a flowchart showing a method of calculating satellite navigation visibility according to an embodiment of the present invention.

FIG. 8 is a flowchart showing a method of calculating satellite navigation visibility according to an embodiment of the present invention.

In operation 810, the processing unit 120 may binarize an input sky view image to create a binary image.

The input sky view image may be an image that is photographed with a fisheye lens in a vertical direction.

In operation 820, the extraction unit 130 may extract a plurality of feature points from the binary image.

Specifically, the extraction unit 130 may form a plurality of virtual lines originating from a central point of the binary image at a certain angle, search for boundary points between a sky and an object on the plurality of virtual lines, and extract the boundary points as the plurality of feature points.

In this case, the certain angle may be 30 degrees, and the number of the plurality of virtual lines originating from the central point of the binary image may be 12.

According to an embodiment of the present invention, the satellite navigation visibility calculation apparatus 100 may further include a conversion unit configured to convert positions of the plurality of feature points from spherical coordinates to Cartesian coordinates.

In operation 830, the calculation unit 140 may calculate the satellite navigation dilution of precision (DOP) corresponding to the sky view image, using the plurality of feature points.

Figure 9:
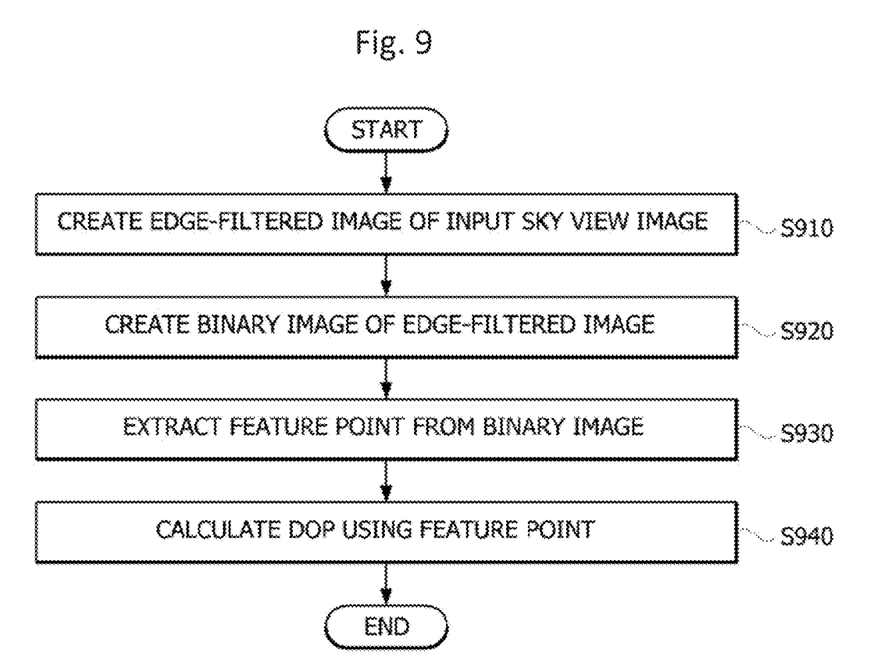
FIG. 9 is a flowchart showing a method of calculating satellite navigation visibility according to another embodiment of the present invention.

FIG. 9 is a flowchart showing a method of calculating satellite navigation visibility according to another embodiment.

In operation 910, the filter unit 110 may create an edge-filtered image by applying the edge detect filter to an input sky view image.

The input sky view image may be an image that is photographed with a fisheye lens in a vertical direction.

In operation 920, the processing unit 120 may binarize the edge-filtered image to create a binary image.

In operation 930, the extraction unit 130 may extract a plurality of feature points from the binary image, form a plurality of virtual lines originating from a central point of the binary image at a certain angle, search for boundary points between a sky and an object on the plurality of virtual lines, and extract the boundary points as the plurality of feature points.

In this case, the certain angle may be 30 degrees, and the number of the plurality of virtual lines originating from the central point may be 12.

According to an embodiment of the present invention, the satellite navigation visibility calculation apparatus 100 may further include a conversion unit configured to convert positions of the plurality of feature points from spherical coordinates to Cartesian coordinates.

In operation 940, the calculation unit 140 may calculate the satellite navigation dilution of precision (DOP) corresponding to the sky view image, using the plurality of feature points.

The units described herein may be implemented using hardware components, software components, and some combination thereof. For example, the units and components may be implemented with one more general-purpose computers or special-purpose computers, such as, for example, a processor, a controller, an arithmetic logic unit (ALU), a digital signal processor, a microcomputer, a field programmable array (FPA), a programmable logic unit, a microprocessor, or any other device capable of executing and responding to instructions. The processing device may run an operating system (OS) and one ore more applications that run on the OS. The processing device also may access, store, manipulate, process, and create data, in response to execution of the software.

For purpose of simplicity, the description of a processing device is used as singular; however, it will be understood by those skilled in the art that the processing device may include a plurality of processing elements and/or a plurality types of processing elements. For example, the processing device may include a plurality of processors or one processor and one controller. In addition, the processing device may have another processing configuration, such as a parallel processor.

The software may include a computer program, a piece of code, an instruction, or some combination thereof, for independently or collectively instructing or configuring the processing device as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. In particular, the software and data may be stored by one or more computer-readable recording media.

The method according to an embodiment of the present invention may be implemented as program instructions executable by a variety of computers and recorded on a computer-readable recording medium. The computer-readable recording medium may include a program instruction, a data file, a data structure, or a combination thereof. The program instructions recorded on the computer-readable recording medium may be designed and configured specifically for the present invention or can be publicly known and available to those who are skilled in the field of software. Examples of the computer-readable recording medium include a magnetic medium, such as a hard disk, a floppy disk, and a magnetic tape, an optical medium, such as a CD-ROM, a DVD, etc., a magneto-optical medium such as a floptical disk, and a hardware device specially configured to store and perform program instructions, for example, a ROM, RAM, flash memory, etc.

Examples of the program instructions include machine codes made by, for example, a compiler, as well as high-level language codes executable by a computer, using an interpreter. The above exemplary hardware device can be configured to operate as one or more software modules in order to perform the operation in an exemplary embodiment, and vice versa.

A number of examples have been described above. Nevertheless, it will be understood that various modifications may be made. For example, suitable results may be achieved if the desired techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A satellite navigation visibility calculation apparatus comprising:
a processor configured to binarize an input sky view image to create a binary image; a processor configured to extract a plurality of feature points from the binary image; and a processor configured to calculate satellite navigation dilution of precision (DOP) corresponding to the sky view image using the plurality of feature points.

2. The satellite navigation visibility calculation apparatus of claim 1, wherein the extraction processor forms a plurality of virtual lines originating from a central point of the binary image at a certain angle, searches for boundary points between a sky and an object on the plurality of virtual lines, and extracts the boundary points as the plurality of feature points.

3. The satellite navigation visibility calculation apparatus of claim 2, wherein the certain angle is 30 degrees, and the number of the plurality of virtual lines originating from the central point is 12.

4. The satellite navigation visibility calculation apparatus of claim 1, further comprising a processor configured to convert positions of the plurality of feature points from spherical coordinates to Cartesian coordinates.

5. The satellite navigation visibility calculation apparatus of claim 1, further comprising a processor configured to take a photograph with a fisheye lens in a vertical direction to create the input sky view image.

6. A satellite navigation visibility calculation apparatus comprising:
a processor configured to apply an edge detect filter to an input sky view image to create an edge-filtered image;
a processor configured to binarize the edge-filtered image to create a binary image; a processor configured to extract a plurality of feature points from the binary image; and
a processor configured to calculate satellite navigation dilution of precision (DOP) corresponding to the sky view image using the plurality of feature points.

7. The satellite navigation visibility calculation apparatus of claim 6, wherein the extraction processor forms a plurality of virtual lines originating from a central point of the binary image at a certain angle, searches for boundary points between a sky and an object on the plurality of virtual lines, and extracts the boundary points as the plurality of feature points.

8. The satellite navigation visibility calculation apparatus of claim 7, wherein the certain angle is 30 degrees, and the number of the plurality of virtual lines originating from the central point is 12.

9. A satellite navigation visibility calculation method comprising:
binarizing, by a processor, an input sky view image to create a binary image;
extracting, by a processor, a plurality of feature points from the binary image; and
calculating, by a processor, a satellite navigation dilution of precision (DOP) corresponding to the sky view image using the plurality of feature points.

10. The satellite navigation visibility calculation method of claim 9, wherein the extracting of a plurality of feature points includes forming a plurality of virtual lines originating from a central point of the binary image at a certain angle, searching for boundary points between a sky and an object on the plurality of virtual lines, and extracting the boundary points as the plurality of feature points.

11. The satellite navigation visibility calculation method of claim 10, wherein the certain angle is 30 degrees, and the number of the plurality of virtual lines originating from the central point is 12.

12. The satellite navigation visibility calculation method of claim 9, further comprising converting positions of the plurality of feature points from spherical coordinates to Cartesian coordinates.

13. A satellite navigation visibility calculation method comprising:

applying, by a processor, an edge detect filter to an input sky view image to create an edge-filtered image;

binarizing, by a processor, the edge-filtered image to create an binary image;

extracting, by a processor, a plurality of feature points from the binary image; and calculating, by a processor, satellite navigation dilution of precision (DOP) corresponding to the sky view image using the plurality of feature points.

14. The satellite navigation visibility calculation method of claim 13, wherein the extracting of a plurality of feature points includes: forming a plurality of virtual lines originating from a central point of the binary image at a certain angle;

searching for boundary points between a sky and an object on the plurality of virtual lines; and extracting the boundary points as the plurality of feature points.

15. The satellite navigation visibility calculation method of claim 14, wherein the certain angle is 30 degrees, and the number of the plurality of virtual lines originating from the central point is 12.

16. A non-transitory computer-readable recording medium storing a program for executing satellite navigation visibility calculation method comprising:

binarizing an input sky view to create a binary image;

extracting a plurality of feature points from the binary image; and calculating satellite navigation dilution of prevision (DOP) corresponding to the sky view image using the plurality of feature points.

17. A non-transitory computer-readable recording medium storing a program for executing satellite navigation visibility calculation method comprising:

applying an edge detect filter to an input sky view image to create an edge-filtered image;

binarizing the edge-filtered image to create an binary image;

extracting a plurality of feature points from the binary image; and calculating satellite navigation dilution of precision (DOP) corresponding to the sky view image using the plurality of feature points.

* * * * *